Feb. 28, 1967  E. A. MORSE  3,306,795
METHOD OF MAKING NON-PLANAR FIBROUS ARTICLES
Original Filed Sept. 13, 1962  4 Sheets—Sheet 1
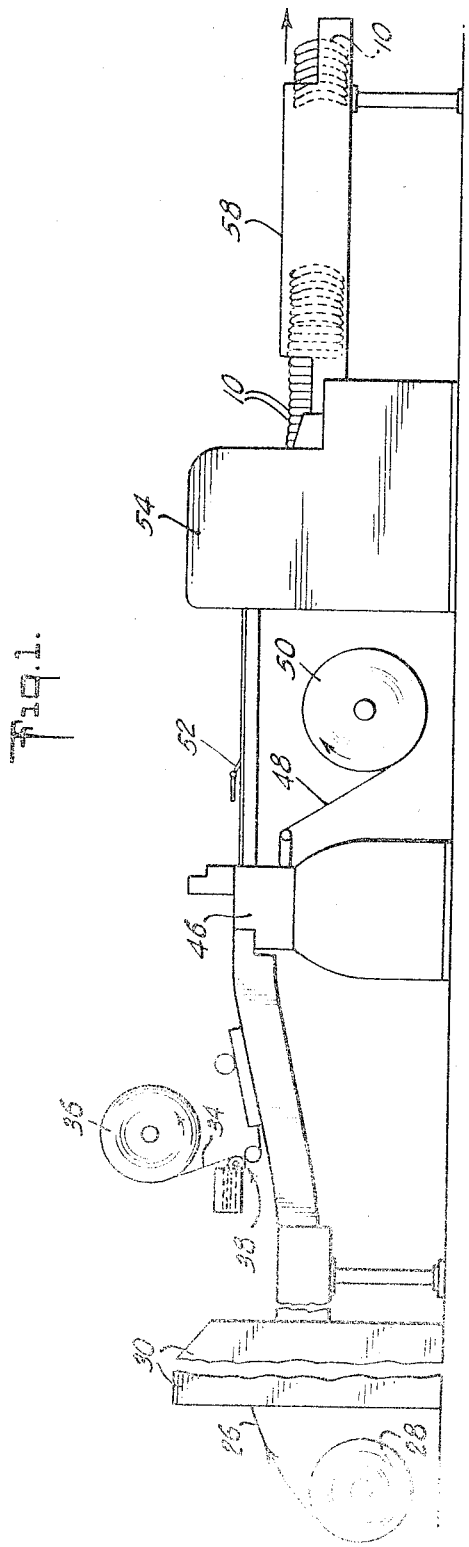
INVENTOR.
EDWARD A. MORSE
ATTORNEY

INVENTOR.
EDWARD A. MORSE
BY
ATTORNEY

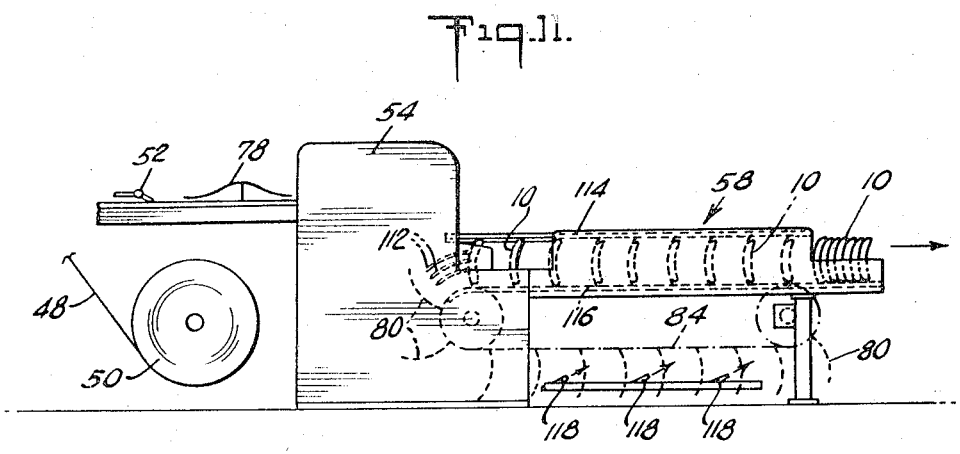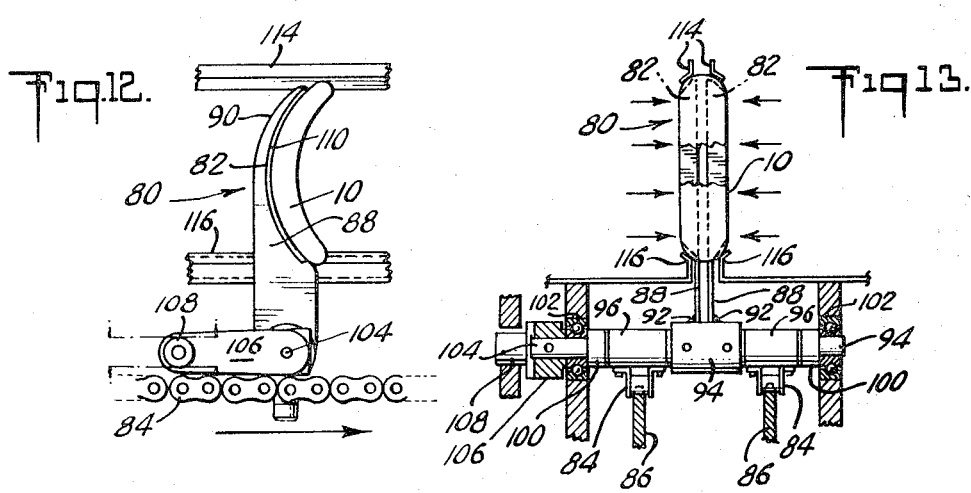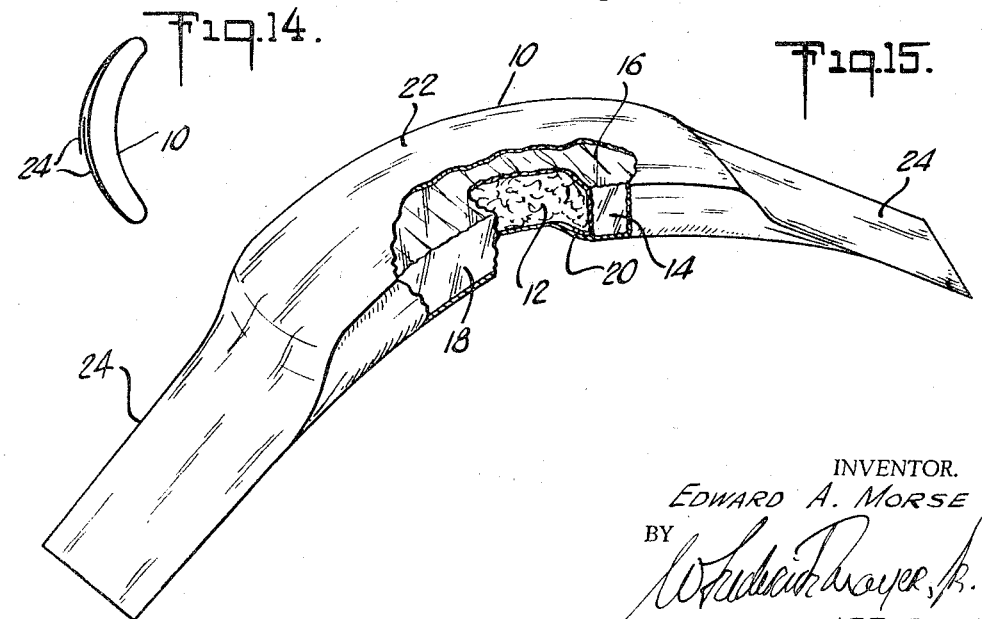

United States Patent Office

3,306,795
Patented Feb. 28, 1967

3,306,795
METHOD OF MAKING NON-PLANAR
FIBROUS ARTICLES
Edward A. Morse, Fanwood, N.J., assignor to Johnson & Johnson, a corporation of New Jersey
Original application Sept. 13, 1962, Ser. No. 223,488, now Patent No. 3,262,451, dated July 26, 1966. Divided and this application Nov. 12, 1965, Ser. No. 507,503
8 Claims. (Cl. 156—85)

This application is a division of my copending application Serial No. 223,488, filed September 13, 1962, now U.S. Patent No. 3,262,451, issued July 26, 1966.

This invention relates to preformed articles and methods of making them and more particularly to preformed non-planar articles containing one or more relatively thick layers of fibrous material for absorbing or padding purposes.

Many different types of articles containing relatively thick layers of fibrous material are used on the body for surgical purposes, for absorbent purposes, as padding, and the like. Examples of such articles are absorbent dressings, which are used for absorbing the exudate of wounds, sanitary napkins, which are used to absorb menstrual fluid, and lactation pads, which are used to absorb lacteal fluid. In the making of casts for setting broken bones, a fibrous padding is often placed between portions of the cast and the part of the body being placed in the cast.

Usually, such articles are made in a flat or planar form. However, in order to function properly, the articles should be held in intimate contact with the body. In most instances, the configurations of the particular parts of the body against which they are placed in use are not flat. Therefore, in order for the articles to be held in intimate contact with such body parts, they must be distorted from their original planar configurations which are non-planar. For example, sanitary napkins are customarily made in a flat, rectangular shape. However, the configuration of the vaginal area against which they are placed in use is arcuate. Therefore, the napkins must be distorted from their flat shape into one which approximates the arcuate configuration of the vaginal area. Lactation pads for absorbing lacteal fluid, usually originally flat, are distorted in use into a generally hemispherical shape to conform them to the chest contours.

Distorting of such originally planar articles into shapes which are non-planar often results in discomfort and in an impairment of their function, particularly if they are used for absorbent purposes. These articles are customarily made from one or more layers of fibrous materials usually enclosed within a woven or non-woven fabric cover. When distorted, the layers are folded and creased. These folds and creases may not only cause discomfort, but may also effect the absorbing effectiveness of the article. It would be desirable, therefore, to provide such articles in a preformed shape to eliminate the necessity for distortion.

I have discovered that preformed, non-planar articles of the foregoing type may be simply and economically provided through the use of shrinkable, orientated plastic materials in the form of films, filaments, bands, yarns, webs and the like. The articles may be made by securing to a surface of one or more relatively thick layers of fibrous material, such as a bat of absorbent wood pulp fibers or cotton of the type commonly used for absorbing and padding purposes, a layer of an axially-orientated plastic material of the foregoing type, e.g., a film, sheet, strands, filaments, subjecting the laminate so formed to conditions which cause the oriented plastic material to shrink whereupon the material assumes dimensions smaller than its original dimensions and, in so doing, causes the fibrous layer to which it is secured to assume a non-planar shape. Articles of different shapes may be obtained, as desired, by appropriate selection of the materials used and by appropriate selection of the treating processes. They may be made economically at high speeds on relatively inexpensive equipment.

The plastic materials which may be employed in the articles of my invention, and in the methods of making them, include axially-oriented films, sheets, threads, filaments, strands and the like of polystyrene, polyvinyl chloride, polypropylene, polyethylene and methyl methacrylate. Such axially-oriented materials are obtained by stretching standard plastic materials, after they are formed by conventional solution casting or extruding techniques, to a larger size in one or more directions, usually accompanied by the application of heat to one or both surfaces of the material, whereupon the material becomes thinner and the molecules comprising the material are rearranged from a generally random arrangement into one which is of a more orderly pattern. Materials of this type are available in the form of films from various sources, as for example from the Plax Corporation under the names "Polyflex" and "Methaflex"; from the Cordite Company under the name "Cordite 1,000"; from W. R. Grace & Company under the name "Cryovac"; and from Goodyear Tire and Rubber Company under the name "Vitafilm ST." These films may be slit into strands or bands of different widths.

By way of illustrating the invention, I shall refer more specifically to axially-oriented films of plastic materials. It is to be understood, however, that axially-oriented plastic materials in forms other than films may be used in various embodiments of the invention.

Most axially-oriented films currently available are biaxially oriented. A biaxially-oriented film is one which has been stretched both longitudinally and transversely, i.e., stretched in two mutually perpendicular directions. The degree of biaxial orientation may be the same in both directions, or it may be different. As a result of the axial orientation, certain forces are built up into the films, providing, in effect, what might be termed as "elastic memory." These forces can be released and the films shrunk from their stretched, axially-oriented sizes to smaller sizes by exposing them to heat. I may utilize this feature of such films in the practice of my invention.

Axially-oriented plastic films can be obtained with varying shrink characteristics. For example, W. R. Grace & Company's "S" Film, a vinyl chloride-vinylidene chloride copolymer, shrinks about 45% at 205° F.; their "D" Film, an irradiated, medium density polyethylene, shrinks about 50% at 250° F., and their "Y" Film, a polypropylene, shrinks about 55% at 310° F. Films which may be shrunk up to 80% of their preshrunk, axially-oriented size are available. The shrink characteristics of the films at different temperatures may also vary. By selectively utilizing these properties of the films, the types of non-planar articles which may be made in accordance with this invention may be varied as desired. In addition, oriented plastic films can be provided to have controlled amounts of shrinking in one or more directions, i.e., machine direction and transversely thereof, with equal or different degrees of shrinkage in the different directions. These characteristics also lend themselves to the preparation of preformed, non-planar articles which are shaped in one or more dimensions, and in different ways.

Upon orientation, the films gain in tensile strength. Further, films which are waterproof or which are soluble in water are available. These features may be suitably employed in the making of various embodiments of the invention.

A preformed, arcuately shaped sanitary napkin which is curved in the direction of its length is a preferred embodiment of an article incorporating the invention. A napkin of this form has the general arcuate configuration of the vaginal area against which it is positioned in use and thus is comfortable to wear, less conspicuous and absorbs fluid more efficiently.

In accordance with this invention, such a preformed, arcuately shaped sanitary napkin may be made by adhesively bonding an axially-oriented plastic film to a surface of one or more relatively thick, flat layers or bats of absorbent fibrous material which form components of a sanitary napkin, and then subjecting the composite so formed to heat which causes the film to shrink. When the axially-oriented film shrinks, it causes the layer or layers of absorbent fibrous material to which it is bonded to assume a non-planar configuration, e.g., to curve. In other forms of the invention, different portions of the axially-oriented plastic film may be selectively shrunk, while other parts remain unshrunk or relatively unshrunk.

In the drawings:

FIG. 1 is a diagrammatic view of apparatus for making an arcuately shaped body, such as a curved sanitary napkin, in accordance with the invention;

FIGS. 1(a) through 1(f) and 2 illustrate the sequential steps in the making of the napkin on the apparatus of FIG. 1;

(FIG. 1(a) is a fragmentary perspective view of a wood pulp board prior to comminuting to form a continuous fibrous bat from which pads which constitute absorbent components of the napkin are cut;

FIG. 1(b) covered on the top, sides and bottom longitinuous absorbent fibrous bat formed from the wood pulp board of FIG. 1(a);

FIG. 1(c) is a transverse sectional view of the bat of FIG. 1(b) covered on the top, sides and bottom longitudinal edge poritons with an axially-oriented plastic film;

FIG. 2 is a nenlarged view of FIG. 1(c);

FIG. 1(d) is a fragmentary side elevational view of a series of absorbent pads cut from the bat of FIG. 1(b) and 1(c) disposed in spaced relationship and enclosed within a continuous length of covering fabric, such as a non-woven fabric;

FIG. 1(e) is a view of individual napkins prior to being arcuately shaped formed by cutting the cover of the covered pads of FIG. 1(d) between spaced pads to provide attachment tabs which are folded around the pads;

FIG. 1(f) is a side elevational view of an arcuately shaped napkin prepared from the napkin of FIG. 1(e) and incorporating the invention;

FIG. 11 is a diagrammatic view of a modified form of the apparatus of FIG. 1;

FIG. 12 is a side elevational view of preforming molds used in connection with the apparatus of FIG. 11 and holding a napkin;

FIG. 13 is a right side view of FIG. 12;

FIG. 14 is a side elevational view of an arcuately shaped napkin made on the apparatus of FIG. 11; and FIG. 15 is a perspective view of an arcuately shaped napkin incorporating the invention, partly cut away to reveal its inner construction, and with its attachment tabs extended.

Figure 3:
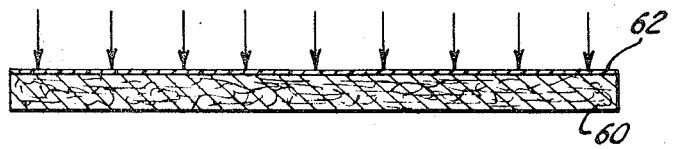
FIG. 3 is another form of the invention illustrating in longitudinal section an axially-oriented sheet of plastic film secured to a relatively thick layer of fibrous material and illustrating by the arrows the direction of application of heat to the composite so formed.

A typical sanitary napkin incorporating the invention is illustrated in FIG. 15. The napkin 10 includes an elongated absorbent pad 12 in the form of a layer of comminuted wood pulp fibers 2 inches wide, 8 inches long, ¾ inch thick and weighing about 150 grains having a selectively shrunken, axially-oriented plastic film 14 of polyvinyl chloride, three-quarters of a mil thick, coextensive with and adhesively bonded to the bottom 16, sides 18, and top longitudinal edge portions 20 of the pad. The composite so formed is enclosed within a wrapper of fabric 22, such as a non-woven fabric, which extends beyond the ends of the pad to provide the usual attachment tabs 24. The napkin is arcuately shaped in the direction of its length with the plasic film positioned on the outside of curvature so that when the napkin is placed against the body when worn, the film will be on the side of the napkin away from the body. The film, because of its water-proof properties, acts as a fluid barrier and prevent menstrual fluid absorbed by the pad of wood pulp fibers from striking through the bottom of the napkin.

A napkin of the foregoing type may be made in accordance with the following method on the apparatus illustrated in FIG. 1. Bleached sulfite wood pulp board 26 is fed from a supply roll 28 into a comminuting mill 30 which disintegrates the board to form individualized wood pulp fibers. The fibers are laid down in the form of a continuous bulky, absorbent bat 32 of the type illustrated in FIG. 1(b), on an endless belt moving horizontally below the mill. The bat is approximately two inches wide, three-quarters of an inch thick, and has a density of about 150 grains per eight inch length. An axially-oriented polyvinyl chloride film 34, three-quarters of a mil thick and four inches wide, such as the type available from the Goodyear Tire and Rubber Company under the designation Vitafilm ST, is fed from a supply roll 36 positioned above the endless belt on which the continous bat of wood pulp fibers is moving below, past a roll type adhesive applicator 38 which applies a light coating of adhesive, such as Rhoplex HA–8, sold by Rohm & Hass Corporation, to one surface of the film. The film may be shrunk about 40% in the direction of its length and is essentially non-shrinkable in the direction of its width by exposure to hot air at 250° C. for 6 seconds. A film which is biaxially-oriented may also be used.

Directly after being coated with the adhesive, and while the adhesive is still wet, the film 34 is positioned on top of the continuous bat 32 of wood pulp fibers with the adhesive coated side of the film in contact with the bat to which it becomes bonded. The film is positioned to cover the top surface 40 and both sides 42 of the bat by folding devices which also lightly compress the bat somewhat to reduce its dimensions. Preferably, the film also extends inwardly over the longitudinal side edge portions 44 of the bottom of the bat for a short distance, e.g., one-quarter of an inch.

The bat with the oriented plastic film adhesively bonded to it then proceeds to a cutting device 46 which severs the bat and the film into the individual film-covered pads 12 approximately eight inches long. After cutting, the individual pads are positioned in spaced relationship on top of a horizontally moving, continuous length of a non-woven fabric 48 fed from a supply roll 50 and which is of sufficient width, e.g., 6½ inches wide, to be folded around the spaced film-covered pads with the longitudinal edges of the non-woven fabric disposed in overlapping relationship on the top of the pads. The overlapped edges of the non-woven fabric are thus disposed on the same side of the pad as the axially-oriented polyvinyl chloride film. This is the side which, in the finished napkin, is placed away from the body. If desired, the overlapped longitudinal edges of the non-woven fabric may be sealed by an adhesive applied as a line by means of an applicator 52.

The spaced pads enclosed within the non-woven fabric cover next pass to a cutting and stacking device 54 wherein the portions 56 of non-woven fabric cover extending between adjacent ends of adjacent pads are cut approximately midway between the pad ends, thus forming flat sanitary napkins of the conventional type having an absorbent core and an outer cover the ends of which extend beyond the ends of the core to form the attachment tabs 24. In the cutting and stacking device, the attachment tabs are also folded around against the face of the pads covered with the film and the pads then rearranged from a spaced horizontal position to a vertical position with adjacent pads in contact with each other.

The pads so disposed are next directed into a forming oven 58 through which they move continuously. Hot air at a temperature of about 250° C. is applied through jets to both sides 18 of the vertically aligned pads for a period of about six seconds as they move through the oven to heat the film covering the sides. The application of the hot air in this localized manner causes the portion of the film covering the sides of the pad, i.e., the portion upon which the hot air impinges, to shrink. In shrinking, the pad is caused to assume a curved configuration to provide a napkin of the shape illustrated in FIGS. 1(f) and 15. The napkins are then permitted to cool.

By localizing the application of the heat to the film covering the sides of the pads as they move through the oven, shrinkage of the film occurs primarily in those portions. Some shrinking may also occur in those portions of the film which cover the longitudinal top and bottom edges of the pad. Most of the portion of the film extending across the bottom surface of the pad remains unshrunken or shrunken to a lesser extent than those portions covering the sides of the pad. By maintaining the pads in intimate, face-to-face contact with respect to each other as they pass through the forming oven, the faces of the pads are insulated by adjacent pads, thereby minimizing the exposure of those surfaces to the applied heat. By so directing the application of the heat to the film, while insulating or partially insulating other portions of the film, selective shrinkage of the film and selective curvature of the resulting article may be obtained.

Figure 4:
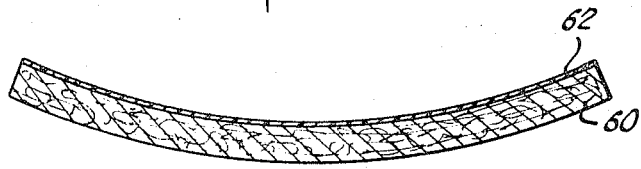
FIG. 4 is a view of the composite of FIG. 3 after shrinking the axially-oriented plastic film by heat to cause the composite to assume a non-planar configuration, e.g., a curve.

In FIGS. 3 and 4 there is illustrated another curved article incorporating the invention which includes a relatively thick, rectangular shaped layer 60 of fibrous material, such as a plurality of superposed layers of cotton cords, having an axially-oriented plastic film 62 secured to it. The arrows in FIG. 3 illustrate that the heat is applied to the film side of the laminate so formed. Upon the application of heat, the film shrinks and in so doing causes the layer of cotton to curve with the film on the inside of curvature, as illustrated in FIG. 4. Articles so formed may be used as padding for casts. If desired, curvature in such articles may be obtained either lengthwise of the layer of fibrous material, or transversely thereof, or in both directions. If an article curved in only one direction is desired, a film oriented essentially or predominately in one direction is used.

Figure 5:
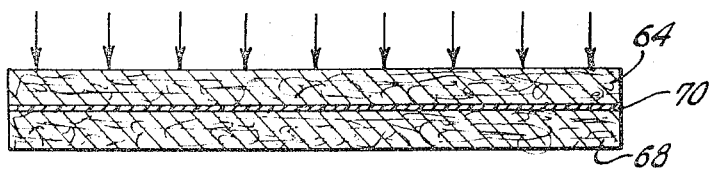
FIG. 5 is a view, in longitudinal section, of another embodiment of the invention which includes an axially-oriented sheet positioned between and secured to relatively thick layers of absorbent fibrous material of different types and also illustrates by arrows the direction of application of heat.
Figure 6:
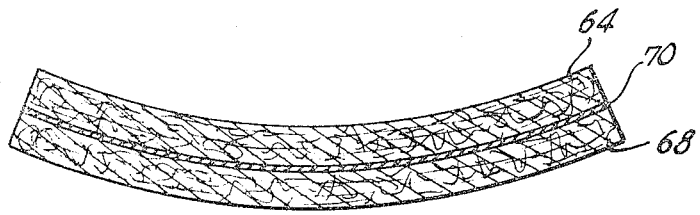
FIG. 6 is a view of the composite of FIG. 5 illustrating the configuration assumed by the composite after the film is shrunk.
Figure 7:
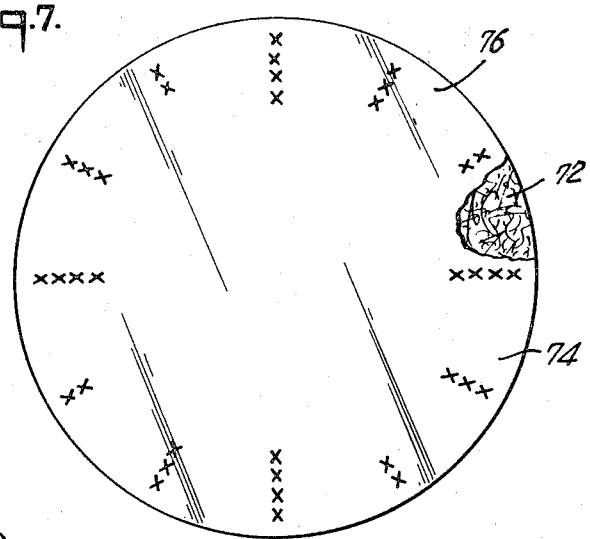
FIG. 7 is a top plan view of a disc-shaped laminate of an axially-oriented plastic film secured to a similarly shaped disc of absorbent material prior to formation into a hemispherically shaped pad.
Figure 8:
FIG. 8 is a sectional view of the disc-shaped laminate of FIG. 7 taken along a diameter and further illustrating by the arrows the direction of application of heat thereto.
Figure 9:
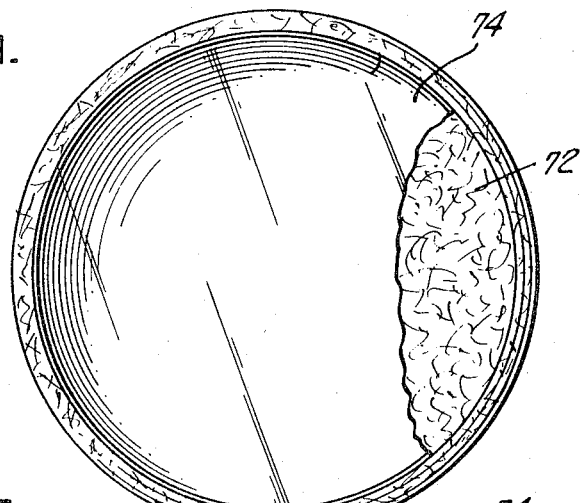
FIG. 9 is a top plan view, partly cut away, of the laminate of FIG. 8 after heating and shrinking the film.
Figure 10:
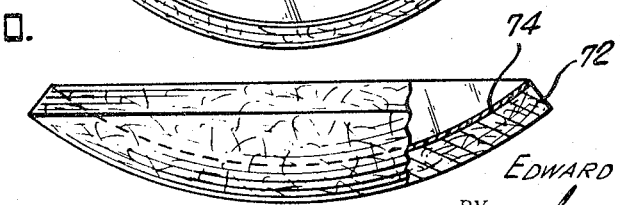
FIG. 10 is a side elevational view, partly cut away, of FIG. 9 illustrating its hemispherical shape.

In FIGS. 5 and 6 there is illustrated a further embodiment of the invention which includes two layers of fibrous material, one of which is less resistant to being curved than the other. For example, the top layer 64 may be a relatively thick layer of comminuted wood pulp fibers and the bottom layer 68 a layer of cotton fibers of equal thickness. The layer of wood pulp fibers is less resistant to being curved than the layer of cotton fibers. A biaxially-oriented plastic film 70 is placed between the layers and is bonded to both layers. When the film is heated by the application of heat in the direction of the arrows as illustrated in FIG. 5, the film shrinks, thus curving both layers of fibers. The article is curved with the layer of wood pulp fibers on the inside of curvature since it is less resistant to being curved, and with the layer of cotton on the outside of curvature.

A still further embodiment of the invention is illustrated in FIGS. 7–10. This embodiment is illustrative of the formation of a hemispherically shaped article in accordance with the invention. A disc-shaped layer 72 of fibrous material has a like shaped, multi-axially-oriented film 74 adhesively bonded to one surface. A multi-axially-oriented film is one which has been stretched in a plurality of directions extending radially outwardly from the center of the film. Heat is applied to the peripheral portions 76 of the film side of the laminate so formed in the locations designated by the crosses in FIG. 7 and in the direction indicated by the arrows in FIG. 8, while the central portion of the film is insulated. Applying heat to the peripheral portions of the film causes the film in those portions to shrink to provide a hemispherically shaped article of the type illustrated in FIGS. 9 and 10. Articles of this shape may be used as lactation pads and for similar purposes.

Any suitable means may be used to cause shrinkage of the film. Hot air is preferred, although hot water and steam may be suitably employed. Alternatively, instead of applying heat to cause shrinkage of the axially-oriented film during the manufacturing operation, the article containing the axially-oriented film may be stored at elevated temperatures which causes shrinking of the film to take place over a somewhat more extended period of time. The amount and rate of shrinkage which occurs is generally related to the time and temperature; greater and more rapid shrinking is obtained when high temperatures are used.

Instead of using films of axially-oriented plastic films whose dimensions are generally the same as the dimensions of the surface or surfaces of the layers of fibrous material to which they are secured, one or more strips of such films may be applied to such surfaces of such layers in different patterns. By way of example, a preformed, arcuately shaped absorbent fibrous body suitable for use as a sanitary napkin and similar to the embodiment described above but not having a moisture barrier may be provided by applying strips of axially-oriented plastic film only to the sides and longitudinal edge portions of one face of the absorbent fibrous pad, with the other surfaces thereof being free from such film. Shrinking the strips of plastic film will cause the absorbent fibrous pad to which they are bonded to assume a curved configuration. In another form, a plurality of parallel, aligned strands of axially-oriented plastic material suitably positioned on and bonded to a surface of the fibrous material may be used.

The extent to which the film shrinks is governed by factors such as the temperature of the heating medium which causes shrinkage, the time the heat is applied and upon the particular axially-oriented film used. A predetermined degree of shrinkage may be obtained in one or more directions with greater or lesser amounts of shrinkage obtained by applying the heat at different temperatures, and for different periods of time, to different portions of the axially-oriented plastic film. By proper selection of the particular axially-oriented film used and by proper control of the application of the heat causing shrinkage of the films, articles of various non-planar configurations may be obtained.

The curvature assumed by the absorbent fibrous layer to which the axially-oriented plastic film is bonded is determined by the resistance to curving of the fibrous layer as well as by the amount of shrinkage which can be obtained in the plastic film. A relatively thin layer of an absorbent fibrous material which does not greatly resist being curved, such as a layer of wood pulp fibers, will be curved more easily than a similarly sized layer of cotton fibers because cotton fibers tend to resist deformation more than wood pulp fibers. Greater or lesser amounts of curvature in each of the foregoing types of absorbent fibrous bodies may thus be obtained by approximately selecting the particular fibrous material used.

In addition, the ability of the film to cause a layer of fibrous material to curve is influenced by the shrink tension of the film. The term "shrink tension" is a measurement of the amount of force an axially-oriented film exerts while it shrinks. If, because of the particular absorbent fibrous material used, or because of the amount used, a relatively great amount of force is required to cause the fibrous material to curve, a film having a high shrink tension may be used. On the other hand, if a lesser amount of force is required, a film having a low shrink tension may be used.

If it is desired to use a film which has a low shrink tension to make an article having components which would ordinarily require a film having a high shrink tension to cause curvature, the article may first be preformed into essentially its desired form and the film then shrunk. Preforming the article before shrinking the film reduces the resistance to curving and consequently the amount of force the film is required to exert to cause curvature and to hold the article in its curved form.

Such articles may be made by methods and on apparatus similar to the above-described method and apparatus for making an arcuately shaped sanitary napkin by using preforming molds. Apparatus which uses such molds is illustrated in FIGS. 11–12. The apparatus is identical with the apparatus illustrated in FIG. 1 up to and including the adhesive applicator 52 for applying a line of adhesive to the overlapped longitudinal edges of the cover to seal the edges. Directly after the adhesive is applied to the overlapped longitudinal edges of the cover, and just before the covered, spaced pads enter into the cutter and stacker, they pass through a turnover device 78 which inverts the cover and the pads to a position with the film side of the pads down. The portions of the cover between the pads are then cut in the cutter and stacker to form sanitary napkins of conventional flat form as described above.

As the sanitary napkins pass from the cutter and stacker, they are placed into molds 80 which preform the napkins into the general shape desired and hold the napkins in such shape in their passage through the forming oven wherein the film is shrunk.

As illustrated in FIGS. 12 and 13, a typical preforming mold for use in making an arcuately shaped napkin incorporating the invention may comprise a pair of spaced, arcuately shaped metal plates 82, 82 which define an arcuately shaped napkin receiving pocket which is approximately of the configuration desired in the finished napkin. For a napkin having a pad eight inches long, the mold may have a radius of curvature of four inches on the inside of the mold. The molds are slightly narrower than the width of the napkin so that the longitudinal edges of the napkin extend beyond the edges of the mold.

A series of such molds are supported in spaced relationship on two spaced, parallel endless chains 84 which pass horizontally through and below the oven 58 in continuous cyclical movement. The chains are supported on and moved by sprockets 86 driven by any suitable means.

Each mold is supported on the chains by means of metal support members 88 one end 90 of each of which hold the arcuately shaped metal plates forming the preforming mold and the other end 92 of each of which is secured to a collar 94 keyed to a horizontal axle or shaft 94 which extends beyond the collar and beyond the chains.

The shaft is rotatably connected to each chain by a bushing 96 secured to the chain and positioned on the shaft on each side of the collar. Thrust collars 100 are provided on the shaft outside of the bushings. The ends of the shaft beyond the thrust collars are provided with bearings 102 which ride in tracks which follow the pattern of the chains and which define the movement of the molds in their cyclical movement through the oven. One end 104 of the shaft is provided with a trailing link 106 secured at its forward end to the shaft and at its rearward end with a bearing 108 which rides in a cam track to maintain the mold in an upright position in its passage through the oven.

Such molds are located in spaced relationship on the chains which in their movement drive the molds through the oven in continuous timed relationship. The molds are spaced from each other on the chains a sufficient distance to receive a sanitary napkin as it is discharged from the cutter and stacker and with clearance between adjacent molds holding napkins.

As a napkin is discharged from the cutter and stacker, it is positioned in a mold which is moving in the direction of the oven. The tab ends of the napkin cover are positioned behind the surface of the napkin adjacent to the face 110 of the mold by any suitable mechanism. The napkin is placed in the mold with the side of the pad covered with the axially-oriented plastic film adjacent to the face of the mold. Locating the napkin in this manner is achieved by inverting the covered pads prior to their entry into the cutter and stacker as disclosed above.

A napkin discharged from the cutter and stacker is of conventional flat form and hence must be forced into the arcuately shaped mold in order to be preformed. This may be accomplished by means of side restraining slides 112 which urge the napkin into the mold. As illustrated in FIG. 11, the side restraining slides may be in the form of curved metal bars located on each side of the molds just as they enter into the cutter and stacker to receive a discharged napkin. The side restraining slides are spaced apart a distance slightly smaller than the width of the napkin and thus define an opening smaller than the napkin width through which the napkins pass on their way to the forming oven. As the napkins pass through the opening, the inner surfaces of the slides engage the outer edges of the napkin at approximately the central portion of the length of the napkin and exert a drag or restraining action on the napkin. Such action causes the napkin, which is straight, to be urged back into the mold and to general conformity with it.

As the napkin moves toward the oven, the top and bottom ends of the napkin contact a set of top and bottom restraining slides 114 and 116, respectively, which may be in the form of angle irons. These restraining slides are positioned in superposed relationship and extend horizontally through the oven above and below the napkin. The distance between the inner faces of the slides is slightly less than the height of the napkin when it is in the mold. These top and bottom restraining slides begin to exert their restraining action just before the napkins enter the oven. Since the napkins have been induced to assume the configuration of the mold by the side restraining slides, as soon as the top and bottom restraining slides contact the top and bottom ends of the napkins, the napkin will be held within the mold and the side restraining slides are no longer necessary and may terminate. The napkins are thus held in the mold in a preformed configuration as the molds and the napkins held by them pass through the oven.

As the napkins pass through the oven, jets of hot air are applied to the side edges of the napkins in the manner described above causing the film covering the sides to shrink. The portions of the film extending across the bottom surfaces of the pads are adjacent to the molds and are thus insulated by the molds. Since the opposite faces of the napkins are exposed, the portions of the film extending along the front surface of the pads are also exposed and thus will also shrink, thereby assisting in curving the napkins.

In a continuous operation, the molds pass through the oven with regularity and may become heated and their insulating properties decreased. As a result, the portion of the film extending across the back of the pad may also become heated and may shrink. It is desirable, therefore, to cool the molds after they leave and before they enter the oven for another cycle by any appropriate means, such as by cooling air nozzles 118.

By using such preforming molds, oriented plastic films having lower shrink tension may be employed since in the preforming operation, the resistance of the pad of fibers to curving which the film must overcome to induce such curving is substantially reduced. After the film has shrunk, the napkins, upon their removal from the mold and cooling, maintain their arcuate configuration. Obviously, molds may also be used to preform an article in these operations where films having high shrink tensions are used.

It is apparent that modifications, variations and changes may be made in the foregoing illustrative embodiments of the invention while still remaining within its spirit.

What is claimed is:

1. The method of making a preformed, non-planar fibrous body comprising securing a heat shrinkable, axially-oriented layer of plastic to a surface of a relatively thick layer of fibrous material with the direction of axial orientation of said plastic layer being in the direction that said fibrous body is to be made non-planar, and heating said plastic layer while so secured to said fibrous layer to shrink said plastic layer and thereby form and hold said fibrous layer in a non-planar configuration.

2. The method in accordance with claim 1 wherein said layer of plastic is a film.

3. The method of making a preformed, non-planar fibrous body comprising heating a relatively thick layer of fibrous material having a heat shrinkable, axially-oriented plastic layer secured to a surface thereof with the direction of axial orientation of said plastic layer being in the direction that said fibrous body is to be made non-planar whereby said plastic layer shrinks to form and hold said fibrous layer in a non-planar configuration.

4. The method of making a preformed, non-planar fibrous body comprising securing a heat shrinkable, axially-oriented layer of plastic to a surface of a relatively thick layer of fibrous material with the direction of axial orientation of said plastic layer being in the direction that said fibrous body is to be made non-planar, forming said fibrous layer and plastic layer assembly into a shape approximating the non-planar shape desired, and then heating said plastic layer while so secured to said fibrous layer to shrink said plastic layer and thereby hold said fibrous layer in the non-planar shape desired.

5. The method in accordance with claim 1 wherein said layer of plastic is multi-axially oriented.

6. The method in accordance with claim 1 wherein portions of said layer of plastic are heated to a greater extent than other portions to shrink selectively said plastic layer.

7. The method of making an arcuately shaped sanitary napkin comprising securing a heat shrinkable, axially-oriented layer of plastic to a surface of a relatively thick elongated layer of fibrous material, the direction of axial orientation of said layer of plastic being in the direction of the length of said fibrous layer, enclosing said layers within a cover, and heating said plastic layer in the direction of said length while so secured to said fibrous layer to shrink said plastic layer and thereby form and hold said sanitary napkin in an arcuate shape.

8. The method in accordance with claim 7 wherein said fibrous layer and plastic layer assembly is preformed into approximately the shape desired before said plastic layer is heated.

References Cited by the Examiner

UNITED STATES PATENTS

| | | | |
|---|---|---|---|
| 2,304,989 | 12/1942 | Snowden | 264—342 |
| 2,784,456 | 3/1957 | Grabenstein. | |
| 2,964,040 | 12/1960 | Ashton et al. | 128—290 |
| 3,092,246 | 6/1963 | Harrison et al. | 264—342 |
| 3,178,495 | 4/1965 | Richard et al. | 264—288 X |

EARL M. BERGERT, *Primary Examiner.*

P. DIER, *Assistant Examiner.*